United States Patent
Gale et al.

(10) Patent No.: US 7,950,303 B2
(45) Date of Patent: May 31, 2011

(54) TRANSMISSION TEMPERATURE SENSING AND CONTROL

(75) Inventors: Allan Roy Gale, Livonia, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 888 days.

(21) Appl. No.: 11/923,056

(22) Filed: Oct. 24, 2007

(65) Prior Publication Data
US 2009/0111651 A1    Apr. 30, 2009

(51) Int. Cl.
*F16H 59/00* (2006.01)
(52) U.S. Cl. ........................................... 74/335
(58) Field of Classification Search .................. 74/335
See application file for complete search history.

(56) References Cited

U.S. PATENT DOCUMENTS

| | | |
|---|---|---|
| 6,262,556 B1 | 7/2001 | Hubbard et al. |
| 7,635,961 B2 * | 12/2009 | Kimura et al. ................ 318/560 |
| 2010/0156338 A1 * | 6/2010 | Lu et al. ........................ 318/798 |

* cited by examiner

*Primary Examiner* — Dirk Wright
(74) *Attorney, Agent, or Firm* — Allan J. Lippa; Alleman Hall McCoy Russell & Tuttle LLP

(57) ABSTRACT

As one example, a propulsion system for a vehicle is provided, comprising: a propulsion device configured to provide mechanical work via a crankshaft; a transmission having an input shaft coupled with the crankshaft and an output shaft, wherein said transmission includes a plurality of selectable gear ratios between the input and output shaft; at least one drive wheel coupled with the output shaft; an actuation device configured to adjust the selected gear ratio of the transmission; and a control system configured to adjust an electrical signal provided to the actuation device to obtain an indication of a temperature dependent electrical parameter of the actuation device and to adjust the selected gear ratio of transmission by varying the signal provided to the actuation device in response to said indication.

20 Claims, 11 Drawing Sheets

TRANSMISSION TEMPERATURE SENSING AND CONTROL

BACKGROUND AND SUMMARY

Vehicle propulsion systems typically include a transmission for transferring mechanical work from a propulsion device such as an internal combustion engine or electrically powered motor to a drive wheel of the vehicle. These transmissions can be configured to provide a plurality of selectable gear ratios between an input shaft for receiving the mechanical work and an output shaft for delivering the mechanical work to the drive wheel. A transmission controller can be provided for selecting the appropriate transmission gear ratio. In some examples, the controller can adjust the transmission gear ratio via one or more transmission actuators that can manipulate the various transmission elements for effectuating the selected gear ratio by way of a clutch or other suitable device.

One approach for controlling the actuation signal provided to these transmission actuators is described by U.S. Pat. No. 6,262,556. This approach describes how the actuation signal that is provided to an actuator during a transmission shift can be adjusted based on a measured temperature of the transmission's hydraulic fluid. In particular, U.S. Pat. No. 6,262,556 describes how a temperature measured at the transmission sump can be used to select the actuation signal.

However, the inventors herein have identified several issues with the above approach. As one example, the inventors have recognized that measuring the temperature of the hydraulic fluid at only a single location, such as by way of a temperature sensor, provides only a limited indication of transmission temperature during some conditions. For example, during warm-up of the transmission after a cold start, thermal gradients may exist between different regions of the transmission. Furthermore, if the temperature sensing capability of the temperature sensor becomes degraded over time, the transmission may be improperly controlled. Further still, a dedicated transmission temperature sensor can add additional cost and complexity to the transmission.

As such, the inventors herein have addressed some of the above issues by a propulsion system for a vehicle, comprising a propulsion device configured to provide mechanical work via a crankshaft; a transmission having an input shaft coupled with the crankshaft and an output shaft, wherein said transmission includes a plurality of selectable gear ratios between the input and output shaft; at least one drive wheel coupled with the output shaft; an actuation device configured to adjust the selected gear ratio of the transmission; and a control system configured to adjust an electrical signal provided to the actuation device to obtain an indication of a temperature dependent electrical parameter of the actuation device and to adjust the selected gear ratio of transmission by varying the signal provided to the actuation device in response to said indication.

In this way, each actuator of the transmission can be used to provide an indication of temperature, thereby providing a distributed indication of transmission temperature even where temperature gradients exist. Thus, the actuation signal provided to each actuator can be controlled in response to their respective temperature indication and the timing of the actuation as well as the transmission shift points can be more accurately controlled by the transmission control system.

As another example, a method of operating a transmission of a vehicle powertrain including at least a first and a second actuator is provided. The method comprises performing a transmission shift by actuating a first transmission element via the first actuator and actuating a second transmission element via the second actuator; and varying a timing of actuation of the first transmission element relative to the second transmission element based on an indication of a temperature dependant electrical property of at least one of the first actuator and the second actuator.

In this way, two or more actuators of the transmission can be coordinated based on an indication of temperature obtained from an temperature dependant electrical parameter of one or more actuators, such as an electrical resistance of the actuator coil, for example. Furthermore, in some examples, the actuators can be coordinated based on a comparison of their respective temperature indications, thereby enabling smoother and more efficient transmission shifts.

DETAILED DESCRIPTION

Figure 1:
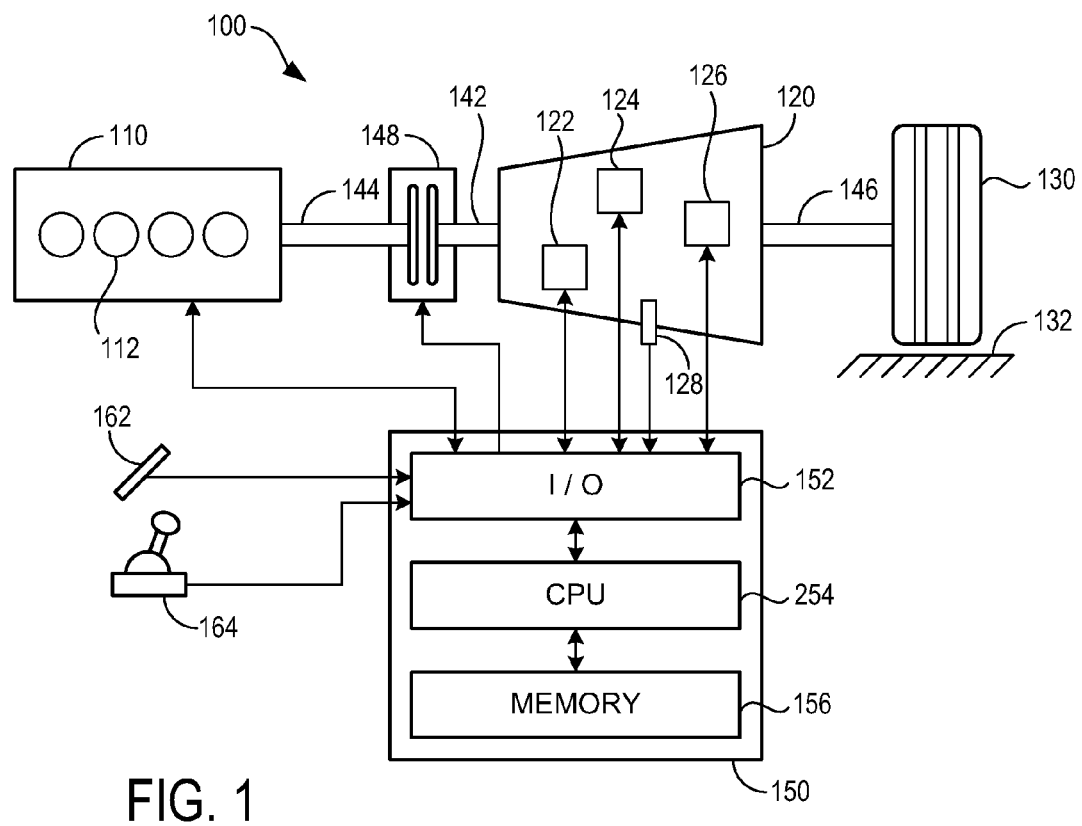
FIG. 1 shows a schematic depiction of an example vehicle powertrain including a transmission having a plurality of hydraulic actuators.

FIG. 1 a schematic depiction of an example vehicle powertrain 100 including an internal combustion engine 110, transmission 120, and at least one driven wheel 130 communicating with a ground surface 132. Engine 110 includes one or more combustion chambers or cylinders indicated at 112. A mechanical output of engine 110 can be provided via a crankshaft 144. Note that engine 110 is merely one type of propulsion device that can be configured to provide mechanical work to a drive wheel of the vehicle. In other examples, engine 110 can be replaced with an electrically powered drive motor. In still other examples, engine 100 can be included with an electrically powered drive motor, such as where vehicle powertrain 100 is configured as a hybrid electric vehicle (HEV).

Transmission 120 includes an input shaft 142 coupled with crankshaft 144 of engine 110 via a torque converter 148. Torque converter 148 can be provided in some examples for varying the rigidity of the coupling between crankshaft 144 and input shaft 142. Transmission 120 also includes an output shaft 146 coupled with drive wheel 130. Thus, a mechanical output provided by engine 110 can be delivered to drive wheel 130 via transmission 120 and/or torque converter 148.

Figure 2A:
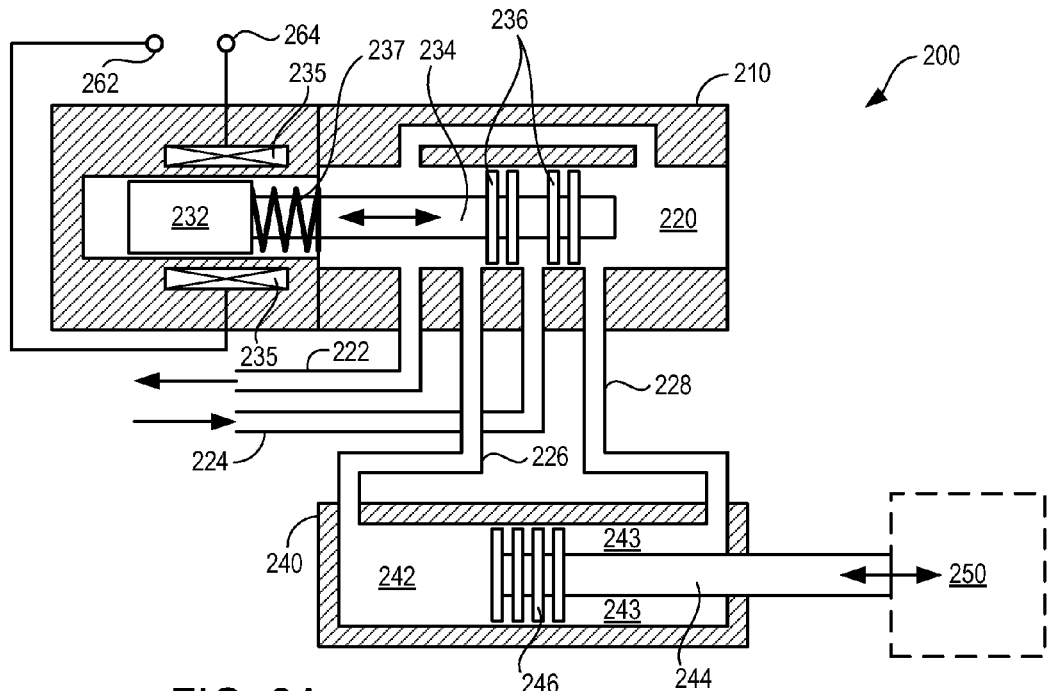
FIGS. 2A and 2B show a schematic depiction of an example electric circuit for a hydraulic actuator of a transmission.

Transmission 140 can include one or more actuators for controlling the engagement and disengagement of various transmission elements. Some of these actuators are shown schematically at 122, 124 and 126. As one non-limiting example, some of these actuators may be configured as hydraulic actuators for engaging or disengaging one or more clutches of the transmission. These clutches may be hydraulically actuated by way of a hydraulic fluid as shown in greater detail in FIG. 2A. Furthermore, these clutches can be used, for example, to enable an adjustment of the transmission operating state, including the gear ratio provided between input shaft 142 and output shaft 146. Actuators 122, 124, and 126 can include an electromechanical actuator coil (e.g. a solenoid) for opening and closing a hydraulic valve for controlling the pressure applied to the transmission clutches as also shown in FIG. 2A. In some examples, transmission 140 may also include a temperature sensor indicated at 128, which can provide an indication of transmission temperature to controller 150. However, in some examples, temperature sensor 128 may be omitted from transmission 120.

The various actuators, including 122, 124, and 126, can be controlled by controller 150. Controller 150 can include a computer or an electronic control unit (ECU) comprising an input/output interface (152), a central processing unit (CPU) 154, and memory 156. Note that the memory may include read-only memory (ROM), random access memory (RAM), and/or keep-alive memory (KAM). Each of the input/output interface, CPU, and memory can communicate via a data bus.

Figure 2B:
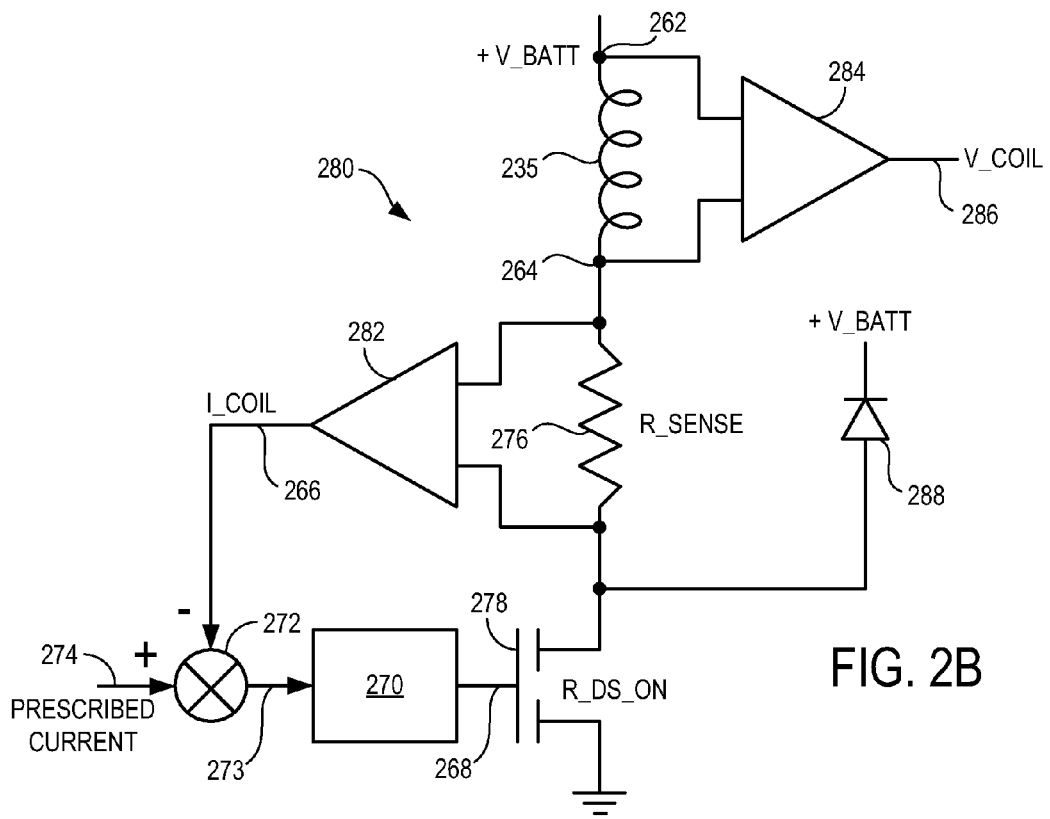

Controller 150 can obtain powertrain operating condition information from various sensors associated with the powertrain and can send various control signals to the powertrain to control operation of the engine, torque converter, and/or transmission via interface 152. For example, interface 152 can send adjust the position of the various transmission actuators by applying an electrical current to their respective actuator coils. FIG. 2B shows an example circuit for controlling an example transmission actuator that can communicate with controller 150. The combination of controller 150 and the various mechanical and electrical subsystems that can be used for carrying out the commands of controller 150 are collectively referred to herein as the powertrain control system. Furthermore, it should be appreciated that the control system can include other controllers and electrical and/or mechanical subsystems beyond those described herein.

Controller 150 can also receive engine operating conditions from engine 110, including an indication of the speed of crankshaft 144. Controller 150 can also receive an input from one or more user input devices. For example, a vehicle operator can provide an input via pedal 162, which may be configured as an accelerator pedal, a brake, or a clutch. Furthermore, controller 150 can receive input from the vehicle operator via a transmission gear selector 164. In response to these various inputs, the control system including controller 150 can adjust the operating state of engine 110, torque converter 148, and transmission 120. For example, controller 150 can adjust the lock-up state of torque converter 148 and/or the selected gear ratio of transmission 120 in response to input received from user input devices 162 and 164.

FIGS. 2A and 2B show an example transmission actuator and respective actuator circuit that may be operated by controller 150 to adjust an operating state of the transmission. Referring specifically to FIG. 2A, an example transmission actuator 200 is described. Actuator 200 can be used as one of actuators 122, 124, and 126 shown schematically in FIG. 1. Actuator 200 can include a hydraulic valve including a valve body 210 defining an internal region 220. A valve arm 234 can include a plurality of valve seals indicated generally at 236 for partitioning or defining different sub-regions within region 220.

Valve arm 234 can be fixedly coupled with a valve armature. The position of valve armature 232 can be varied relative to valve body 210 by actuator coil 235, thereby causing valve arm 234 to translate relative to valve body 210. Thus, actuator coil 235 and valve armature 232 in this particular example form a solenoid. As one example, controller 150 can vary the electrical power applied to coil 235, for example, by varying the current and/or voltage that is applied across nodes 262 and 264, in order to cause valve arm 234 to translate relative to valve body 210. In this particular example, armature 232 and hence valve arm 234 can be biased in a particular direction by a spring indicated at 233. However, in other examples, actuator 200 can include two coils that provide opposing forces. Regardless of the particular configuration, controller 150 can adjust the position of valve arm 234 by adjusting the voltage or current that is applied to coil 235.

A hydraulic fluid can be provided to internal region 220 of valve 200 via a hydraulic passage 224. As one example, the hydraulic fluid that is provided to internal region 200 via passage 224 can be pressurized by a hydraulic pump or other suitable pressurization device. Hydraulic fluid can also be removed from internal region 200 via hydraulic passage 222. In some examples, hydraulic passage 222 may include a valve (not shown) that can be controlled by controller 150 to regulate the flow of hydraulic fluid leaving internal region 220. Internal region 220 can include additional hydraulic passages 226 and 228 that communicate with actuator arm assembly 240. Assembly 240 includes an actuator arm 244 having a sealing armature 246 that defines two separate internal regions of assembly 240 as indicated at 242 and 243.

Thus, region 242 can selectively communicate with region 220 via passage 226 and region 243 can selectively communicate with region 220 via passage 228 depending on the position of valve seals 236 within region 220 relative to the position of the various hydraulic passages. For example, during a first position of valve arm 234 and valve seals 236, region 242 can be hydraulically isolated from region 220 and during a second position, region 243 can be hydraulically isolated from region 220. As pressurized hydraulic fluid is provided to region 220 via passage 224, the hydraulic pressure in each of regions 242 and 243 can be varied relative to each other by adjusting the position of valve arm 234. The difference in hydraulic pressure between regions 242 and 243 causes actuator arm 244 and sealing armature 244 to translate relative to assembly 240. In this way, a transmission element 250 that communicates with actuator arm 244 can be adjusted by the control system by varying the voltage and/or current that is applied to nodes 262 and 264. Note that the particular actuator described with reference to FIG. 2A is merely one example of a hydraulic actuator for a transmission and that other suitable actuators may be used.

FIG. 2B shows an example actuator driver circuit 280 that can utilized by controller 150 to adjust the voltage and/or current applied at nodes 262 and 264, thereby facilitating the actuation of actuator 200. Note that circuit 280 and controller 150 can collectively be referred to as the control system. Furthermore, circuit 280 is merely an example of a circuit that may be used for actuator coil 235 and that other suitable circuits may be used.

As indicated at 274, controller 150 can prescribe a current that is to be applied to the actuator coil. As indicated at 273, an error 273 between the actual current applied to the coil as indicated 266 and the prescribed current 274 can be provided to pulse width modulator 270, which can provide an output signal 268 to transistor 278. Transistor 278 can act as a switch in response to signal 268 to enable a potential to be applied across resistor 276 and coil 235 between ground (lower potential) and a higher potential of an applied energy source such as a battery denoted as V_BATT. The resistance across the transistor when it is on (i.e. driven by PWM 270 is indicated as R_DS_ON. A diode 288 can be provided between the higher potential side of transistor 278 and V_BATT. The resistance across resistor 276, denoted as R_SENSE, and the potential across resistor 276 can drive op amp 282 to provide an indication of the actual current (I_COIL) applied to coil 235. Similarly, an indication of the voltage across coil 235 (V_COIL) can be obtained from op amp 284 as indicated at 286. As another example, the voltage across coil 235 can be obtained from the difference between the voltages at nodes 262 (V_262) and 264 (V_264). As yet another example, the voltage across the coil can be obtained from individual measurements by the following equation: V_COIL=V_262−(I_COIL*R_SENSE)−(I_COIL*R_DS_ON).

Regardless of the particular configuration of the actuator driver circuit, controller 150 can adjust the level of current that is applied to the actuator coil (I_COIL) and can obtain an indication of the resulting coil voltage (V_COIL). Alternatively, the controller can adjust the voltage applied across the coil (V_COIL) and can obtain an indication of the applied current (I_COIL).

Figure 3A:
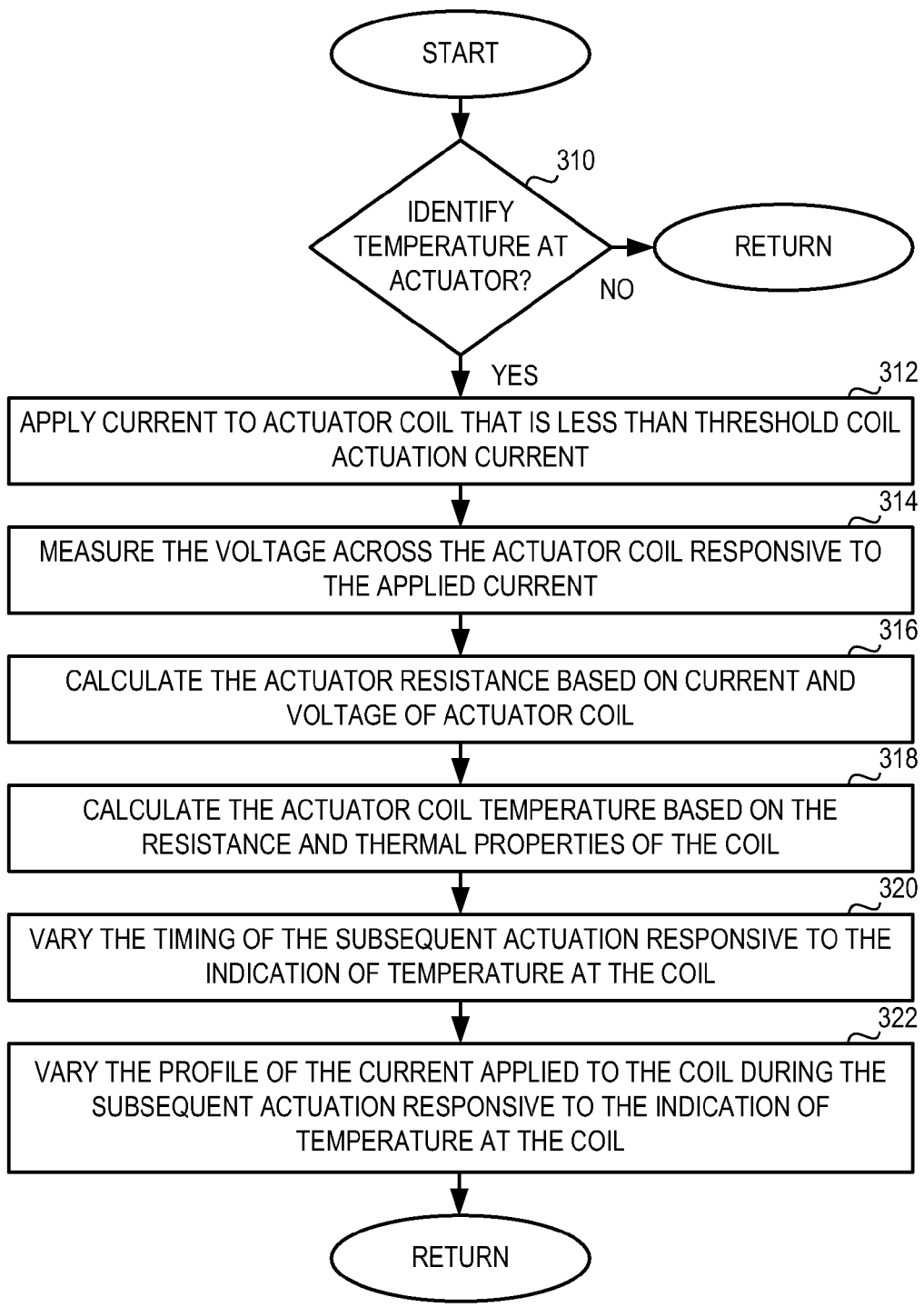
FIGS. 3A-3C show flow charts depicting example approaches for identifying temperature at the transmission actuator.
Figure 3B:
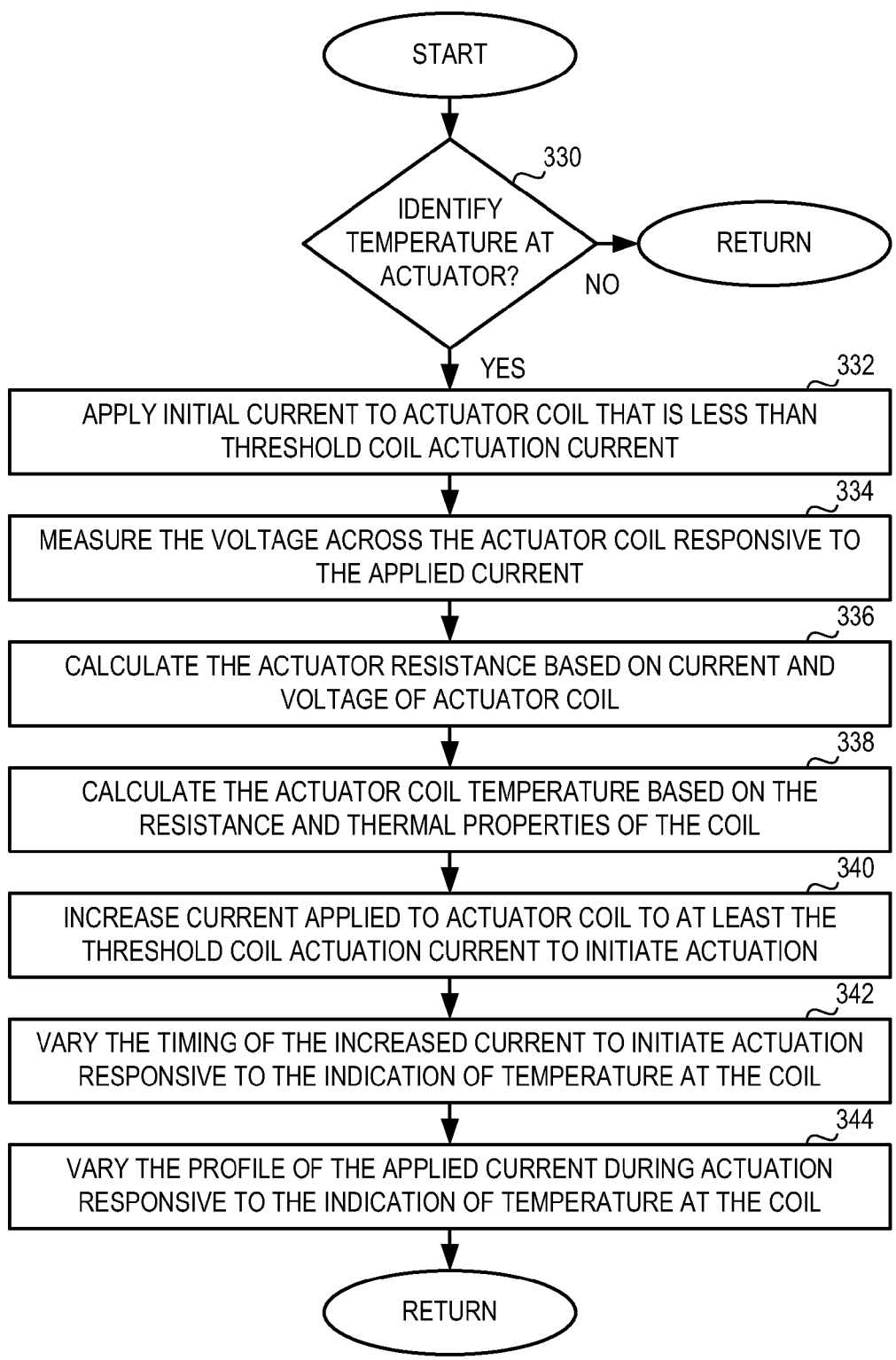
Figure 3C:
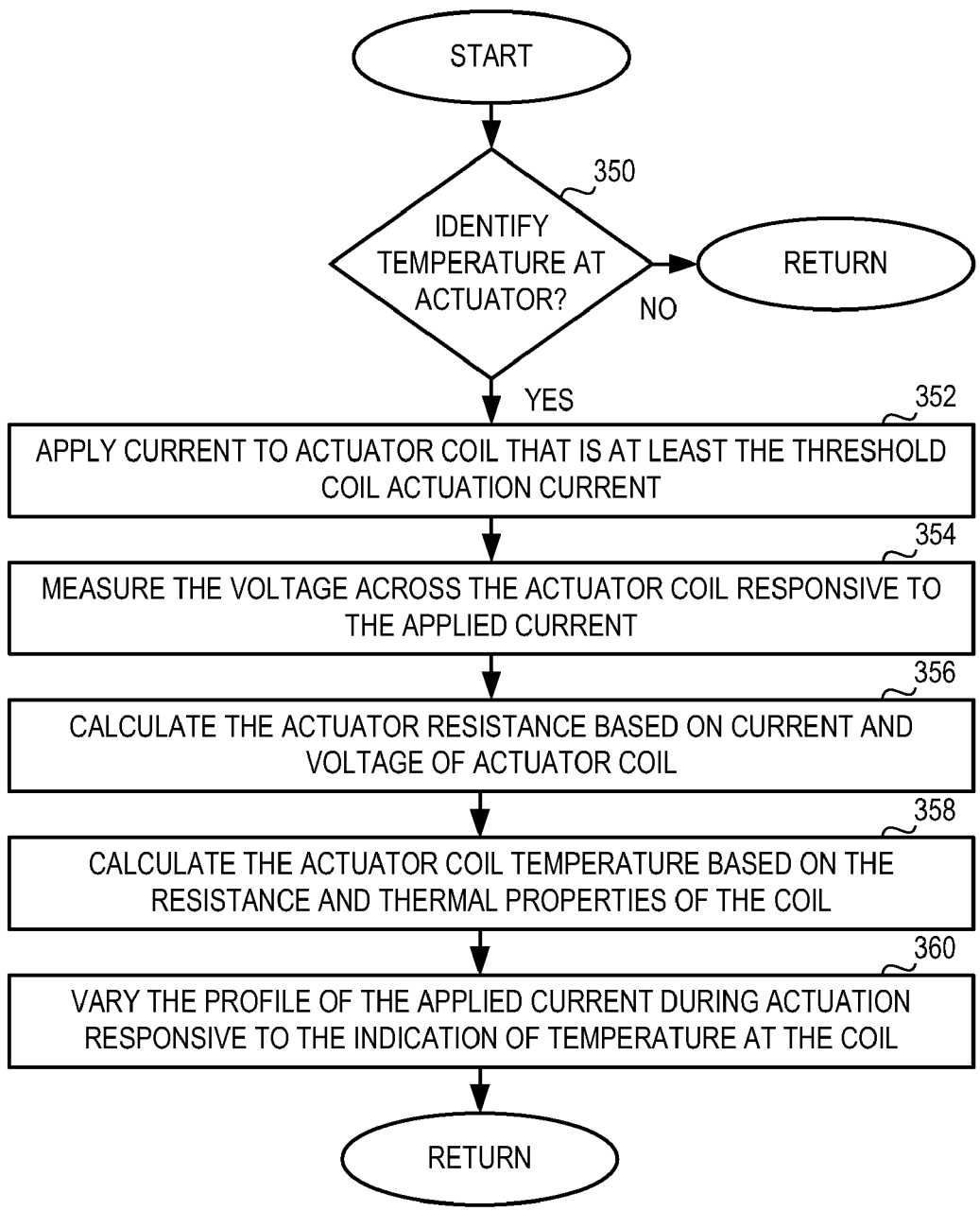

FIGS. 3A-3C show several flowcharts depicting example methods for identifying a temperature of a transmission actuator coil, which can be used by the control system as an indication of transmission fluid temperature in the vicinity of the actuator. In response to the indication of temperature obtained from the actuator coil, the control system can adjust actuator operation so that adjustments of transmission elements can be properly coordinated across a variety of thermal conditions. For example, where the physical properties of the hydraulic fluid, such as fluid viscosity and/or density, change with variations in temperature, the transmission actuators can respond differently to a given current that is applied by the control system to cause an adjustment of transmission operating state.

In each of the different approaches described with reference to FIGS. 3A-3C, a temperature dependent electrical property of the actuator coil can be used to identify the temperature at the actuator coil. As one example, the electrical property of the coil can include an electrical resistance of the coil.

As one example, the approach described with reference to FIG. 3A can be utilized where a temperature indication is to be obtained from the actuator coil based on actuator coil resistance without initiating an actuation of a transmission element. At 310, it can be judged whether a temperature indication is to be identified at the actuator. For example, the control system can judge that the temperature at the actuator is to be identified based on a prescribed temperature sampling frequency. As another example, the control system can forego obtaining a temperature measurement from the actuator coil when it is being operated (e.g. energized) to provide actuation of a transmission element. As yet another example, the control system can identify the temperature at the actuator coil before an actuation of a transmission element is to be initiated. If the answer at 310 is yes, the routine can proceed to 312. Alternatively, if the answer at 310 is no, the routine can return.

At 312, the control system can apply a current the actuator coil that is less than a threshold current for actuating the actuator coil (i.e. threshold actuating current). For example, referring also to FIG. 2, the control system can prescribe a current to be applied to the coil as indicated at 274. Note that the threshold actuating current described herein can also vary with the temperature of the surrounding hydraulic fluid. For example, variations in fluid viscosity and/or density that result from changing fluid temperatures can cause the threshold actuating current to increase or decrease relative to a reference actuating current. As such, the threshold actuating current can be identified by the control system based on feedback from previously obtained actuator coil or transmission fluid temperature indications as will be described with reference to FIGS. 3 and 4.

In response to the current applied to the actuator coil (i.e. I_COIL), the control system can measure the resulting voltage (V_COIL) developed across the actuator coil as indicated at 314. At 316, the resistance of the actuator coil can be calculated based on the applied current (I_COIL) and measured voltage as directed by Ohm's law. For example, the control system may calculate the actuator coil resistance (R_COIL) based on the following equation: R_COIL=V_COIL/I_COIL. As another example, the control system can utilize a look-up table or map stored in memory to identify the resistance of the coil based on the applied current and measure voltage. While the approach described at 312 and 314 utilizes an applied current and response voltage, in other examples, a voltage can be applied across the actuator coil and the resulting current can be measured.

At 318, the actuator coil temperature can be calculated by the control system based on resistance obtained at 316 and the thermal properties of the coil. As one example, where the actuator coil comprises copper, the coil temperature (T_COIL) can be calculated based on the following equation: T_COIL=T_REF+((R_COIL−(R_REF)/(R_REF*α_REF)), where R_REF is the resistance of the actuator coil at a reference temperature (T_REF) and α_REF is the temperature coefficient of resistance for the coil material at the reference temperature. For example, where the actuator coil comprises copper, α is equal to approximately 0.004041 at a reference temperature of 20 degrees Celsius and α has the dimensions of an inverse temperature. In some examples, the control system can utilize a look-up table or map stored in memory to identify the coil temperature based on a give coil resistance or it can calculate the coil temperature as described by the previous equation.

Figure 5:
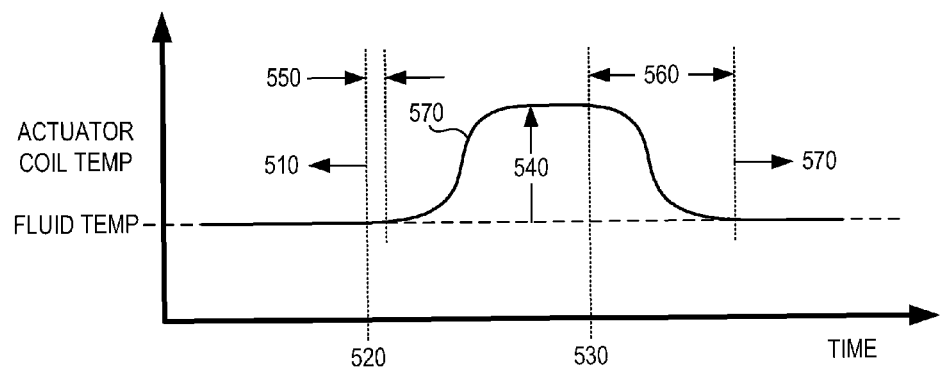
FIG. 5 is a graph showing how the actuator temperature can be increased in response to an actuation.
Figure 6:
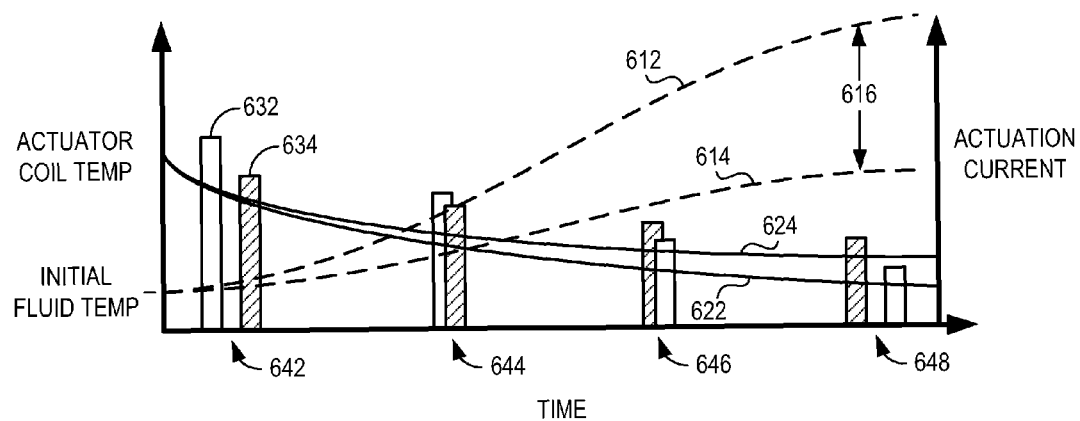
FIG. 6 is a graph showing how actuator control can vary with actuator temperature.
Figure 8:
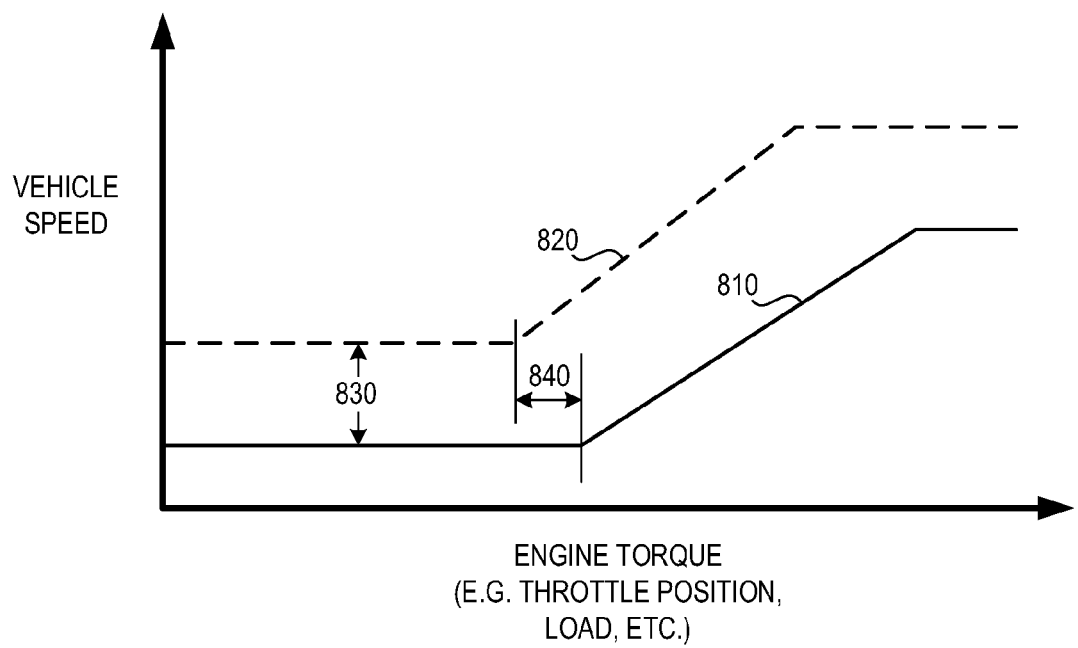
FIG. 8 is a graph shown how transmission shift points can vary with actuator temperature.

As indicated at 320 and 322, the timing of a subsequent actuation of the actuator and/or a profile of the current applied to the actuator during the actuation can be varied responsive to the indication of coil temperature identified at 318. Referring also to FIG. 5, the timing at which the actuator is actuated can be controlled by the control system by varying the timing at which the current applied at the coil reaches or exceeds the threshold actuation current of the coil. In other words, the control system can vary the prescribed current provided at 274. For example, the control system can advance or retard the timing at which the applied current is controlled to attain or exceed the threshold actuating current as shown in FIG. 6. Further, the profile of the current applied at the coil can include the current gain (e.g. the magnitude of the current) as well as the rate of increase and/or decrease of the applied current. For example, the control system can increase or decrease the rate of change of the applied current and/or the magnitude of the applied current in response to actuator coil temperature. In some examples, the control system can utilize a look-up table, a, or an algorithm stored in memory to select a timing for the current and current profile to be supplied to the actuator coil based on the temperature of the surrounding fluid indicated by the coil. For example, FIG. 8 shows how the transmission shift points can be adjusted by the control system responsive to actuator temperature. In this way, where the physical properties (e.g. viscosity, density, etc.) of the surrounding transmission fluid vary with temperature, the actuation of the transmission element can be suitably timed by identifying the temperature of the fluid and adjusting the actuator command current accordingly. Finally, the routine can return.

In contrast to the approach described with reference to FIG. 3A, the approach of FIG. 3B can be utilized where a temperature indication is to be obtained from the actuator in coordination with a subsequent actuation, while still retaining the ability to adjust the timing of the actuation as directed by the commanded current timing and the current profile applied to the coil.

At 330, it can be judged whether to identify the temperature at the actuator. The operation at 330 can be the same as the operation described at 310. For example, the control system can choose to identify the temperature of the actuator just before the actuator is to be operated to actuate a transmission element. If the answer at 330 is yes, the routine can proceed to 332. Alternatively, if the answer at 330 is no, the routine can return.

At 332, an initial current can be applied to the actuator coil by the control system that is less than the threshold coil actuation current. In other words, a current that is insufficient to cause the actuator to actuate the transmission element can be applied to the coil. In response to the applied current, the voltage can be measured as indicated at 334, the actuator resistance can be identified as indicated at 336, and the actuator coil temperature can be determined at 338, for example, as previously described with reference to operations 314, 316, and 318, respectively.

In response to the indication of temperature obtained at 338, the current applied to the actuator coil at 332 can be increased to at least the threshold coil actuation current to initiate actuation, as indicated at 340. The timing at which the applied current attains the threshold actuation current can be varied at 342 in response to the temperature indication obtained at 340. For example, the control system can advance or retard the timing at which the applied current is controlled to attain or exceed the threshold actuation current. Furthermore, the profile of the applied current including the rate of change of the current and the current magnitude can be varied at 344 responsive to the indication of temperature obtained at 340. For example, the control system can increase or decrease the rate of change of the applied current and/or the magnitude of the applied current in response to actuator coil temperature. In this way, the actuator can be controlled based upon the actuator temperature which is indicative of transmission fluid temperature in the vicinity of the actuator. Finally, the routine can return.

In contrast to the approach described with reference to FIG. 3B, the approach of FIG. 3C can be utilized during the initial stages of the actuation process where a temperature indication is obtained from the actuator coil before it begins to increase in temperature due to the applied actuation current, while still retaining the ability to adjust the current profile applied to the coil. For example, the control system can measure the V_BATT or V_262 and I_SOL at the start of the on cycle of PWM 270 to determine the bulk temperature of the actuator coil from the in-rush current before the current causes additional heating of the coil. Thus, the current and voltage of the coil can be obtained during the period indicated at 550 of FIG. 5. Note that one disadvantage of the approach described by FIG. 3C is that the initiation of the actuation may not be variable in at least some examples based on the temperature identified during the same actuation as is the case with the approach of FIG. 3B. However, the actuation timing can be adjusted during subsequent actuations based on the indication of actuator temperature obtained from the previous actuation.

At 350, it can be judged whether to identify the temperature of the actuator. As one example, the control system can obtain the actuator temperature during the initial stages of some or all of the actuations to enable control of the current provided to the actuator coil. In some examples, the operation at 350 can be the same as previously described by operations 310 and 330. If the answer at 350 is yes, the routine can proceed to 352. If the answer at 350 is no, the routine can return.

At 352, a current can be applied to the actuator coil that is at least as great as the actuation current. At 354, 356, and 358, the temperature of the actuator coil can be identified based on the applied current at 352, for example, as previously described by operations 314, 316, and 318, respectively. At 360, the profile of the applied current can be adjusted from the current applied at 352 in response to the indication of temperature obtained at 358. For example, the control system can increase or decrease the rate of change of the applied current and/or the magnitude of the applied current in response to actuator coil temperature.

Thus, FIGS. 3A-3C provide several approaches that may be used to obtain an indication of the actuator coil temperature and/or the temperature of the surrounding transmission fluid, whereby the timing of the actuation as well as the actuation force can be adjusted by varying the timing of the applied current and the profile of the applied current, respectively.

Figure 4A:
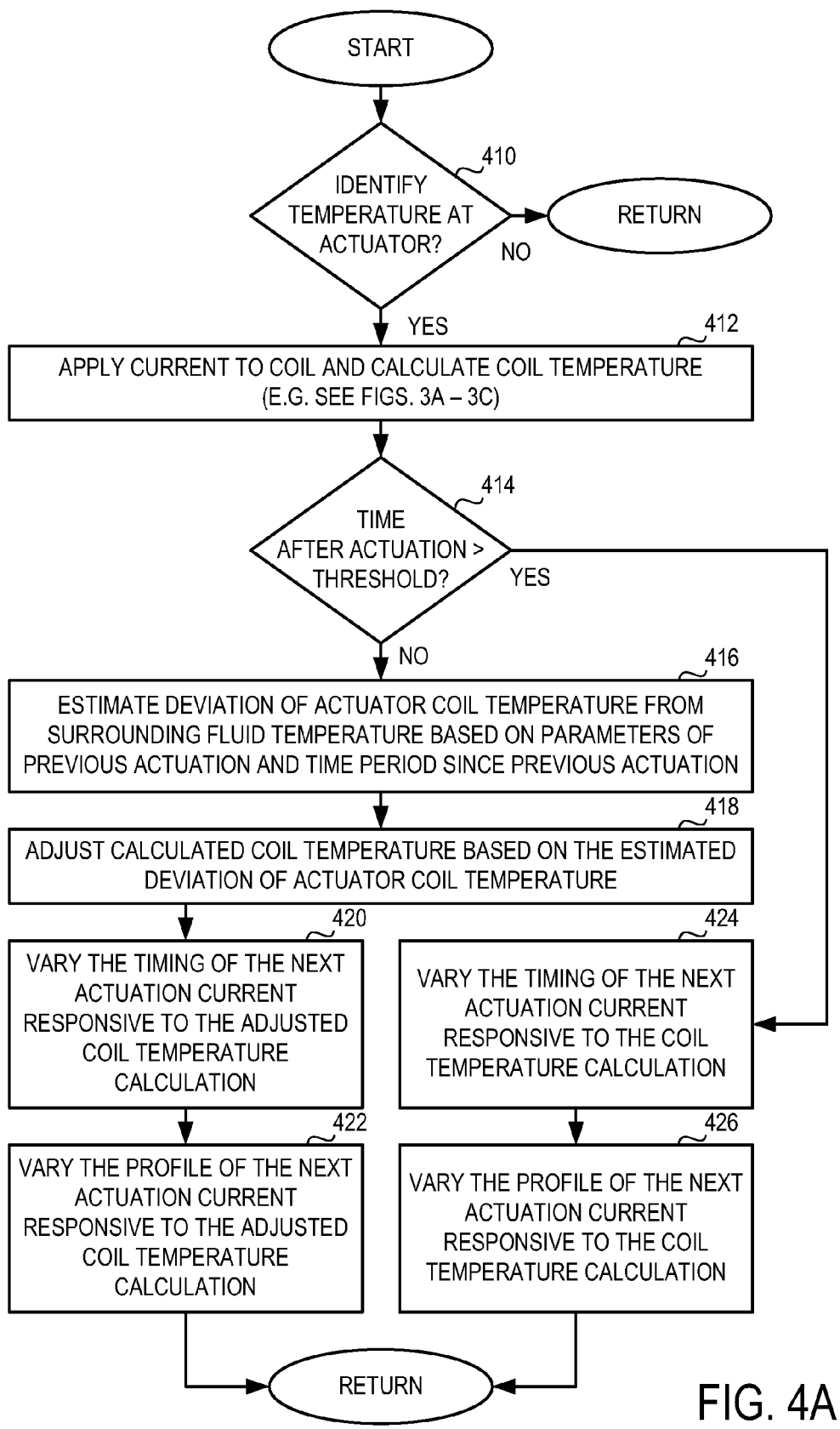
FIGS. 4A and 4B show flow charts depicting example approaches for adjusting the temperature indication obtained from an actuator based upon an estimated temperature deviation from the fluid temperature.
Figure 4B:
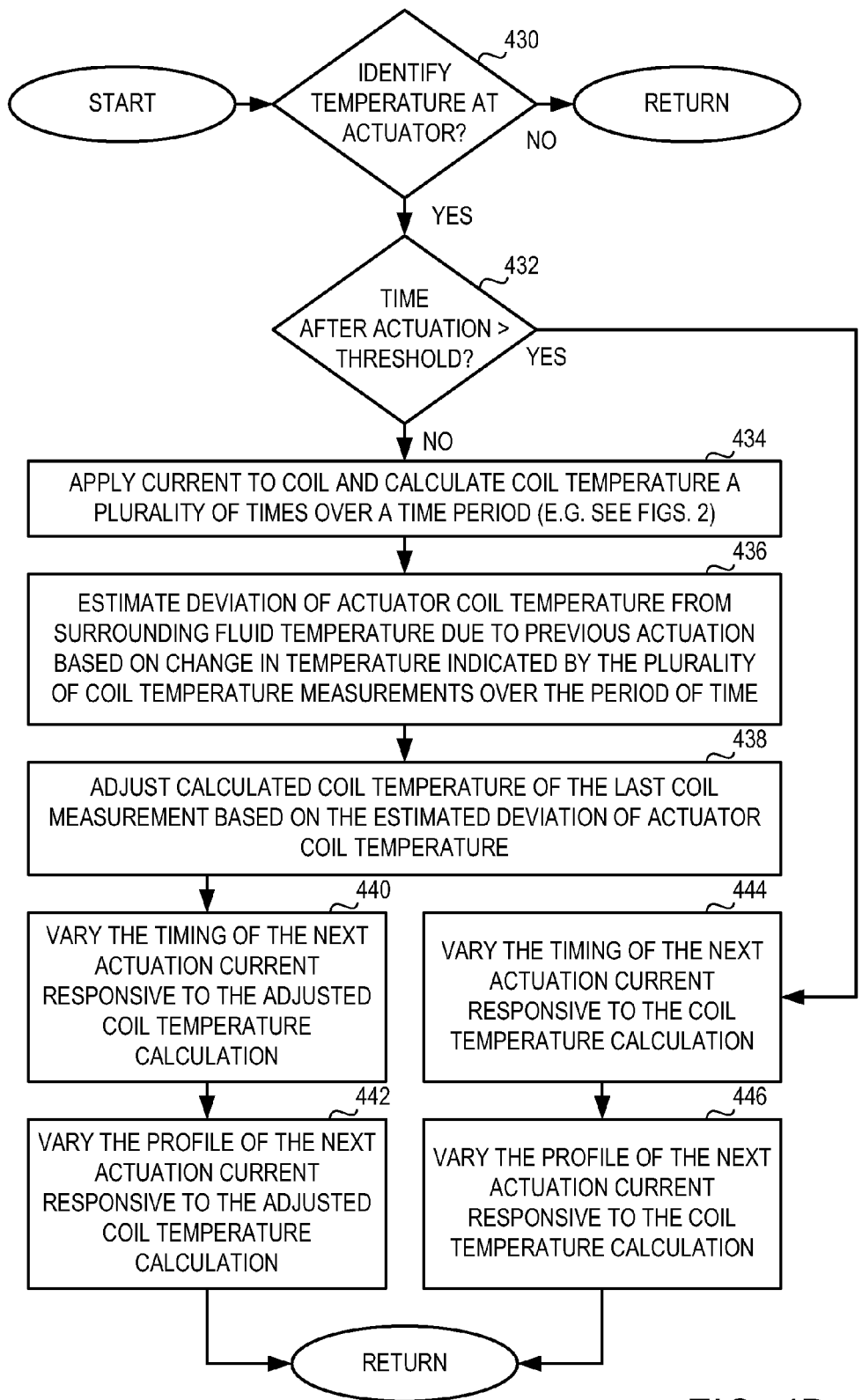

FIGS. 4A and 4B show flowcharts depicting example methods for adjusting the temperature indication obtained from the actuator based on an estimation of a temperature deviation between the fluid temperature and the actuator temperature that can occur due to a previous actuation. Since the current applied to the actuator during an actuation event passes through the actuator coil, which has an inherent resistance, the actuator can increase in temperature and therefore deviate from the fluid temperature. Thus, if the actuator temperature is obtained by one or more of the approaches previously described by FIGS. 3A-3C, the actuator coil can provide a false indication of fluid temperature.

The approach of FIG. 4A adjusts the temperature identified from the actuator based on an estimate of the temperature deviation or difference between the temperature of the surrounding fluid and the temperature of the actuator based upon operating parameters of the previous actuation, while the approach of FIG. 4B obtains multiple indications of temperature from the actuator coil over a period of time after the actuation to estimate the temperature deviation.

Referring specifically to FIG. 4A, at 410, it can be judged whether to identify the temperature at the actuator. This decision can be the same as those described with reference to FIGS. 3A-3C. If the answer at 410 is no, the routine can return. Alternatively, if the answer at 410 is yes, the routine can proceed to 412. At 412, a current can be applied to the actuator coil and a temperature indication of the coil can be obtained as previously described with reference to one of the approaches of FIGS. 3A-3C. At 414, it can be judged whether the time after an actuation of the actuator has been terminated (e.g. when the applied current has been removed or reduced below the actuation current threshold) is greater than a threshold. As one example, the control system can select a time threshold based on operating parameters of the actuator such as actuation time, applied current, transmission fluid temperature, etc. This time threshold can represent a sufficient period of time for the actuator temperature to return to substantially the same temperature as the fluid after the actuation has been terminated. If the answer at 414 is yes, the routine can proceed to 424 and 426, where the indication of actuator coil temperature that was obtained at 412 can be used to adjust the subsequent actuation current and/or the profile of the applied current as previously described with reference to FIGS. 3A-3C.

Alternatively, if the answer at 414 is no (i.e. the time after actuation is less than the threshold), the temperature indication obtained at 412 can be adjusted at 416 based on an estimated deviation of the actuator coil temperature from the surrounding fluid temperature. For example, at 416, the control system can estimate a temperature deviation between the actuator coil and the surrounding transmission fluid based on various operating parameters of the previous actuation and the amount of time since the previous actuation. These operating parameters may include the duration of the previous actuation, the level of current provided to the actuator over the actuation period, and the temperature of the transmission fluid, which may be based on a previous temperature indication provided by the actuator, a temperature indication provided by other transmission actuators or a transmission fluid temperature sensor. Thus, the temperature deviation during a period after a previous actuation as indicated for example at 560 of FIG. 5, can be estimated by the control system.

At 418, the coil temperature indication obtained at 412 can be adjusted based on the estimated temperature deviation obtained at 416. For example, the control system can subtract the estimated temperature deviation from the temperature indicated by the actuator coil to obtain a better indication of the temperature of the transmission fluid in the vicinity of the actuator.

At 420 and 422, the timing of a subsequent actuation and/or the current profile provided to the actuator coil during the subsequent actuation can be varied in response to the adjusted actuator coil temperature obtained from 418. Note that the operations at 420 and 422 can be the same as the operations of 320 and 322 in the case where operation 412 utilized the approach of FIG. 3A, or they may be the same as the operations of 342 and 344 in the case where operation 412 utilized the approach of FIG. 3B, or may be the same as operation 360 in the case where operation 412 utilized the approach of FIG. 3C. Finally, from 422 or 426, the routine can return.

Referring now to FIG. 4B, at 430, it can be judged whether the temperature at the actuator is to be obtained by the control system. If the answer at 430 is no, the routine can return. Alternatively, if the answer at 430 is yes, the routine can proceed to 432. At 432, it can be judged whether the time after actuation of the actuator has been terminated is greater than a threshold. The decision at 432 can be the same as the decision at 414. For example, if the answer at 432 is yes, the routine can proceed to 444 and 446, which can be the same as operations 424 and 426, respectively. Alternatively, if the answer at 432 is yes, the routine can proceed to 434. At 434, a current can be applied to the actuator coil a plurality of times in order to obtain a plurality of temperature measurements over a period of time after the actuation has terminated, for example, as described by the approach of FIG. 3A. For example, as the actuator temperature returns to the temperature of the fluid after the actuation has been terminated, the control system can obtain two or more indications of temperature.

From the temperature measurements obtained at 434, at 436, the control system can estimate the deviation of actuator coil temperature from the surrounding fluid temperature based on a change in the temperature indicated by the plurality of temperature measurements. As one example, where the plurality of temperature measurements indicate a larger temperature difference between each other, it can be inferred that the temperature deviation is larger than if the temperature measurements are more similar. The control system can utilize a look-up table or a map stored in memory to estimate the temperature deviation between the actuator coil and the surrounding fluid based on a temperature difference between two or more temperature measurements performed after the actuation event has been terminated. Furthermore, in some examples, the control system may utilize some or all of the operating parameters of the previous actuation (e.g. as described at operation 416) to improve the accuracy or precision of the estimated temperature deviation.

The operations at 438, 440, and 442 may then be performed, whereby the temperature indicated by the last measurement of the plurality of temperature measurements obtained at 434 can be adjusted based on the estimated temperature deviation obtained at 436, and the timing of a subsequent actuation and/or the current profile provided to the actuator during the subsequent actuation can be varied in response to the adjusted temperature indication obtained at 438. Note that the operations at 438, 440, and 442 can be the same as those previously described at 418, 420, and 422, respectively.

In this way, the control system can utilize one or more of the approaches of FIGS. 3A-3C to obtain an indication of actuator temperature and adjust this indication by an estimated temperature deviation obtained by one or more of the approaches of FIGS. 4A and 4B, whereby the adjusted temperature indication can be used to control the current that is supplied to the actuator coil during a subsequent actuation event. However, in some examples, the control system can utilize temperature indications obtained from the actuator coil only after the actuator has returned to the temperature of the surrounding hydraulic fluid without utilizing a temperature adjustment.

FIG. 5 shows a graph depicting an example of how the actuator coil temperature can deviate from the temperature of the surrounding transmission fluid due to a coil actuation event. In this particular example, the horizontal axis of the graph shows an indication of time and the vertical axis shows an indication of actuator coil temperature. Furthermore, the temperature of the fluid (e.g. the transmission oil) in the vicinity of the actuator is depicted as a horizontal broke line. The graph shows how the actuator coil temperature indicated at 500 can initially be the same as the temperature of the fluid. As indicated at 520, the actuator coil is then supplied with power (e.g. an electrical current) to cause actuation of an element of the transmission. In response to the application of electrical energy to the actuator coil, the temperature of the actuator can begin to increase as indicated at 540. When the electrical energy that is supplied to the coil is finally removed as indicated at 530, such as after the actuator has completed actuation of the transmission element, the temperature of the coil can subsequently return to the transmission fluid temperature over a period of time indicated by 560.

As previously described with reference to FIGS. 4A and 4B, the temperature indication obtained from the actuator can be adjusted based on an estimated temperature deviation caused by a previous actuation. However, in the example shown in FIG. 5, during the periods indicated at 510 and 570, an adjustment of the temperature indication is not required since the temperature of the actuator coil is substantially the same as the surrounding fluid temperature. For example, the threshold period of time judged at 410 and 430 can be at least after the beginning of the period indicated by 570. However, during the period indicated by 560, the temperature indication obtained from the actuator can be adjusted to account for the deviation between the actuator coil temperature and the temperature of the surrounding fluid.

The example shown in FIG. 5 also demonstrates how during a relatively short period of time after power is supplied to the actuator coil, as indicated at 550, for purposes of actuating a transmission element, the temperature of the coil is still substantially the same as the temperature of the fluid. Thus, the temperature of the actuator coil can be obtained during the period indicated at 550, for example as described with reference to the approach of FIG. 3C, without requiring an adjustment of the temperature indication since there is substantially no deviation between the actuator temperature and the temperature of the surrounding fluid.

FIG. 6 shows a graph depicting an example of how the current applied to the transmission actuators can vary with the temperature of the transmission fluid temperature. In this particular example, the horizontal axis of the graph shows an indication of time and the vertical axis shows an indication of actuator coil temperature and actuation current. Beginning on the left side of the graph, initially, the fluid temperature in the vicinity of two separate and remote actuators are substantially the same. For example, during a cold start before the transmission has started warming up, the temperature of the transmission fluid in all locations of the transmission can be equal, such as at ambient. However, as time progresses (e.g. during warm-up, the temperature of the fluid in different regions of the transmission can be heated at different rates. For example, the fluid temperature in the vicinity of a first actuator is indicated at 612 and the fluid temperature in the vicinity of a second actuator is indicated at 614. As shown in FIG. 6, the temperature difference between the two fluid temperatures can differ by a temperature differential indicated at 616. Note that the temperature differential can also decrease, for example, as the temperature of the transmission approaches its steady state operating temperature.

FIG. 6 also shows how the minimum actuation current for each of the actuators can vary with their respective temperature. In other words, as the temperature of the first actuator increases as indicated by 612, the minimum actuation current for the first actuator can also change as indicated at 622. In this particular example, the minimum actuation current decreases with increasing temperature of the actuator and/or surrounding fluid, for example, as the viscosity of the transmission fluid also increases with increasing temperature. However, in other examples, the minimum actuation current can also increase with increasing temperature of the actuator and/or surrounding fluid. FIG. 6 further shows how the minimum actuation current for the second actuator can also vary as indicated at 614 responsive to the temperature of the second actuator indicated at 614. Thus, the difference between the minimum actuation current of the first and second actuators can be observed as the difference between 622 and 624.

As previously described with reference to FIGS. 3 and 4, the time at which the minimum actuation current is applied at the actuator and/or the current profile applied to the actuator can be varied in response to the temperature indication obtained from the actuator. FIG. 6 also shows how the magnitude commanded actuation current can be varied for the first and second actuators as the temperature of the actuators varies. For example, the current applied to the first actuator is indicated at 632 and the current applied to the second actuator is indicated at 634 for a plurality of actuation events indicated at 642-648. Actuation events 642-648 can represent transmission state changes whereby a transmission gear is activated and/or deactivated by the actuation of two or more transmission elements. Note that while actuation of only two actuators is described with reference to the example of FIG. 6, it should be appreciated that more or less actuators can be coordinated to vary an operating state of the transmission.

In this particular example, the various actuation events indicated at 642-648 for the given temperature conditions indicated at 612 and 614 for the two actuators can be used to illustrate how the relative timing at which the actuation current is applied to the actuators can be varied in response to the temperature at each of the actuators. For example, as indicated at 642, the actuation current is first applied to the first actuator before the second actuator, while at other conditions, as indicated at 648, the actuation current can be first applied to the second actuator before the first actuator. Additionally, it can be observed that the relative timing for the application of the actuation current between the two actuators can be advanced or retarded based on their respective temperature conditions. Furthermore, FIG. 6 also shows how the magnitude of the applied actuation current can also be varied with temperature. For example, actuation event 642 shows how the current applied to the first actuator can be greater than the current applied to the second actuator, while during a different actuation event (e.g. at a different temperature condition), the current applied to the second actuation can be greater than the current applied to the first actuator. FIG. 6 shows how the actuation current that is applied to each of the actuators can be controlled to be at least greater than the minimum actuation current for the respective actuator, thereby ensuring that actuation occurs as commanded by the control system. Further still, while not shown in FIG. 6, the rate of increase or decrease of the applied current can be varied for each of the actuators in response to their respective temperature conditions as obtained by at least one of the approaches previously described with reference to FIGS. 3 and 4.

In this way, by adjusting the timing at which the current is applied to the actuator and the profile of the applied current including the magnitude and rate of change during actuation, each actuator can be controlled in response to their specific temperature indication. Thus, the timing and profile of the actuation current that is applied to the actuators can be varied relative to each other as their operating temperatures and hence the temperature of their surrounding fluids deviate from each other.

Figure 7A:
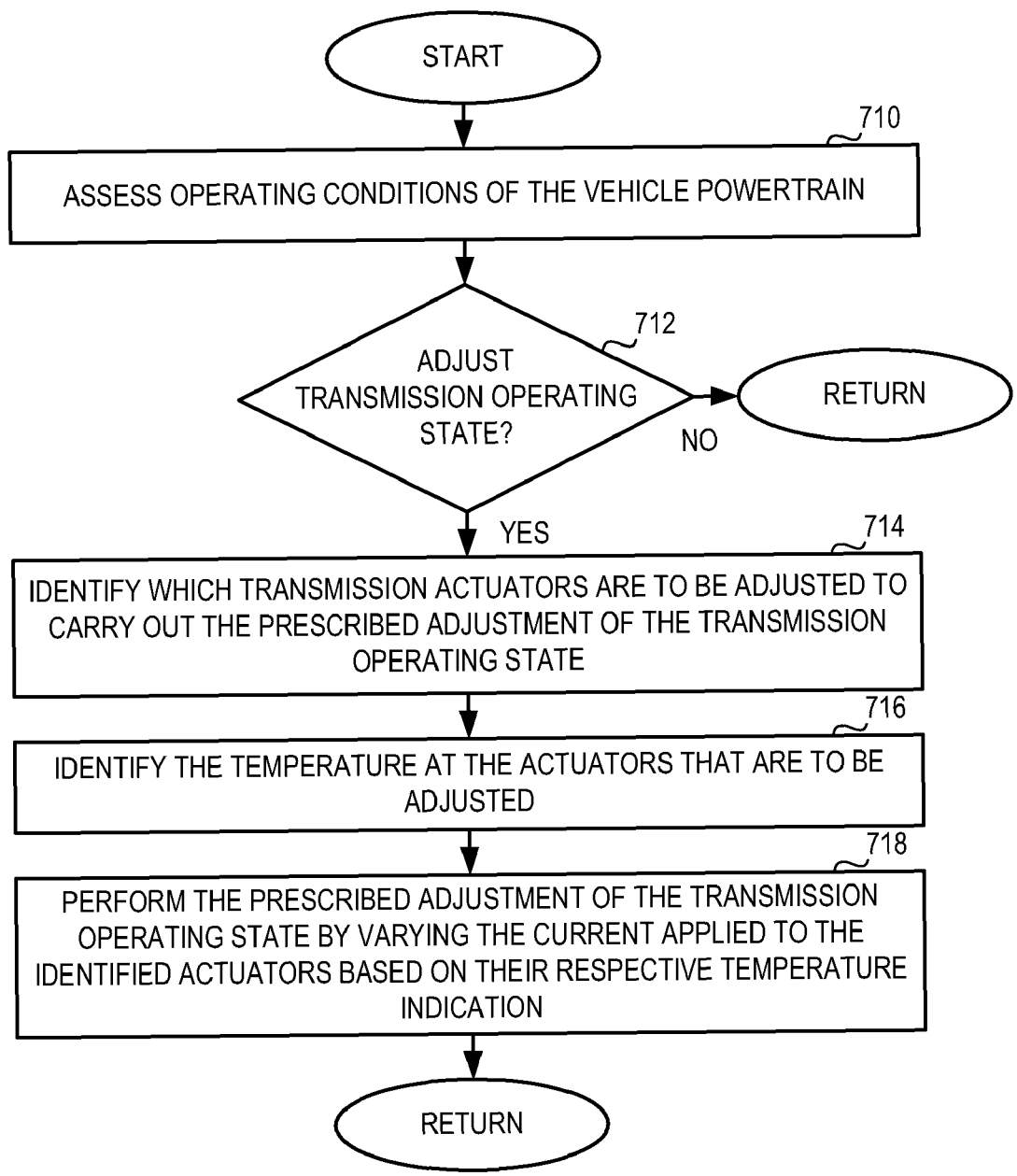
FIGS. 7A and 7B show flow charts depicting example approaches for controlling the actuator in response to the temperature of the actuator or the temperature at other thermally related actuators.
Figure 7B:
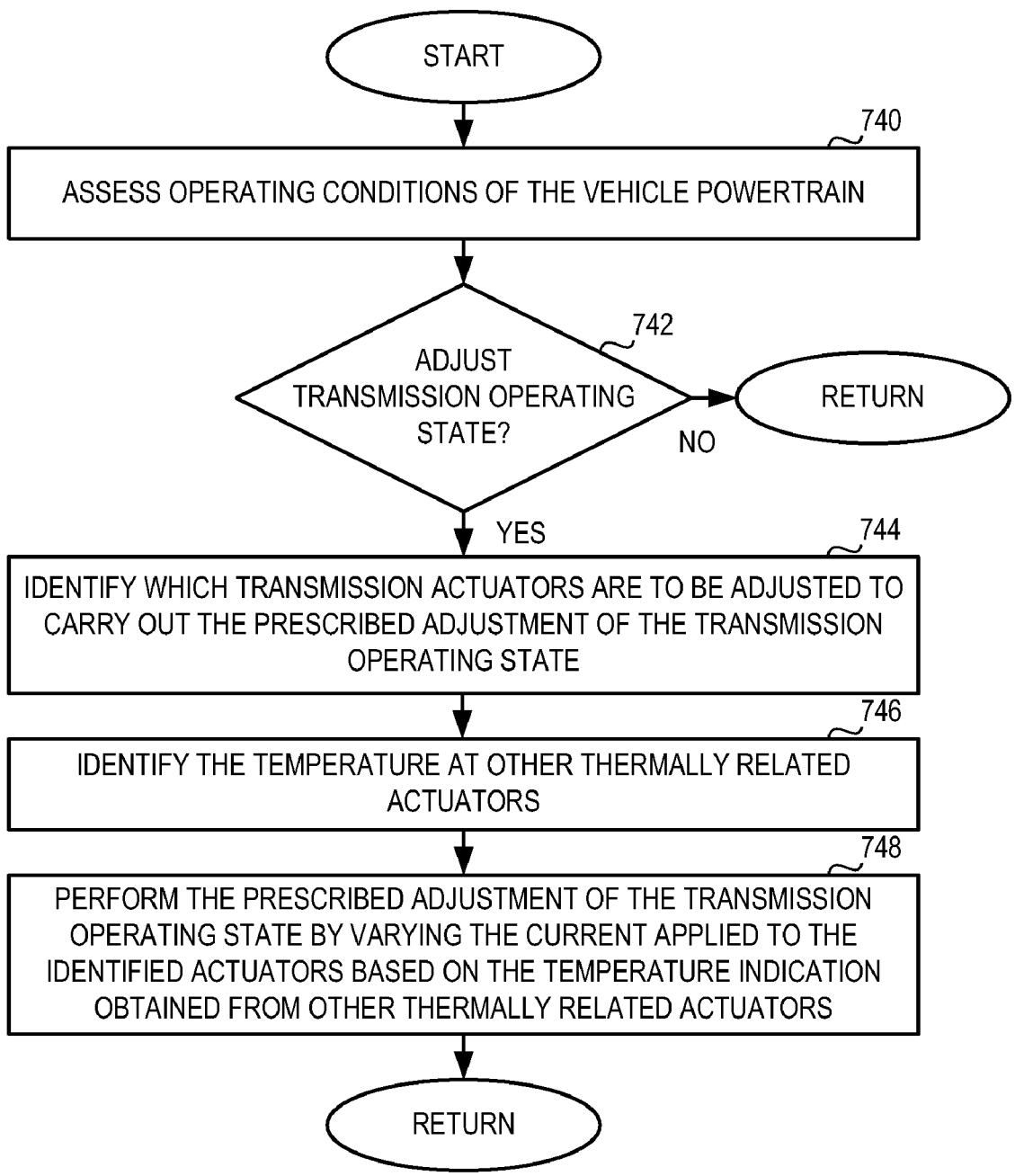

FIGS. 7A and 7B show flowcharts depicting example methods for adjusting an operating state of the transmission by adjusting one or more actuators based upon their respective temperature (e.g. as shown in FIG. 7A) and/or based upon the temperature of other actuators that are thermally related to the adjusted actuator.

Referring specifically at FIG. 7A, at 710, the operating conditions of the vehicle powertrain can be assessed. For example, the control system can identify the various operating conditions of the engine and transmission based on the various sensors described with reference to FIG. 1, including the temperature obtained from the various actuators, transmission input speed, transmission output speed, engine speed, ambient conditions, and input received from the vehicle operator via one or more user input devices.

At 712, it may be judged whether to adjust the operating state of the transmission based on the operating conditions identified at 710. For example, the control system may judge that the transmission operating state is to be adjusted in response to input receive from the vehicle operator including a shift request and/or a request for more or less torque to be delivered to the wheels. As another example, the controls system can reference transmission shift schedules stored in memory that can direct the control system to adjust the operating state of the transmission in response to particular combinations of operating conditions identified at 710.

If the answer at 712 is no, the routine can return. Alternatively, if the answer at 712 is yes, the transmission actuators that are responsible for effectuating the prescribed transmission operating state adjustment can be identified as indicated at 714. For example, to perform a gear change, one, two, three or more actuators can be selected for adjustment. At 716, the temperature at the actuators that are to be adjusted can be identified utilizing one or more of the approaches previously described with reference to FIGS. 3 and 4. For example, the control system can apply a current to the actuator coil and measuring the resulting voltage, which can be correlated with the temperature at the actuator. However, in some conditions, the control system can reference the temperature that was previously identified for some or all of the actuators. For example, the control system can utilize the approaches of FIGS. 3 and 4 to identify the temperature at some or all of the actuators before the transmission adjustment is requested, whereby the identified temperatures can be stored in memory for later recall by the control system. In this way, the adjustment to the transmission state need not be delayed in order to obtain a temperature measurement before adjusting the actuator by application of an actuation current.

At 718, the prescribed adjustment of the transmission operating state can be performed by varying the current applied to the actuators identified at 714 based on their respective temperatures identified at 716. For example, the control system can reference a look-up table or map stored in memory to identify a base actuation timing for each of the actuators, whereby the base actuation timing can be adjusted based on the respective temperature identified for each actuator as demonstrated by FIG. 6. Thus, the control system can adjust the timing at which the actuation current is applied to the actuator, the magnitude of the actuation current, and/or the rate of change of the actuator current. Finally, the routine can return.

FIG. 7B shows an approach similar to the approach of FIG. 7A, except that the temperature obtained from a first actuator can be used to control the actuation of a second actuator. In this particular example, the operations shown at 740, 742, and 744 can be the same as those described by operations 710, 712, and 714, respectively. At 746, the temperature of at least one other actuator can be identified for controlling the actuation of another actuator. As one non-limiting example, the control system can reference a look-up table stored in memory to identify one or more actuators that are thermally related to the actuator that is to be adjusted. In other words, the temperature of at least one actuator that has been obtained by one or more of the approaches described with reference to FIGS. 3 and 4 can be used to control the actuation of at least one other actuator. For example, the control system can reference the last identified temperature of an actuator that is physically closest to the actuator that is to be adjusted (e.g. either spatially or by proximity along the fluid circuit within the transmission) or the actuator can utilize an average temperature obtained from two or more actuators. In this way, the actuation of the actuator need not be delayed in order to obtain the temperature at the actuator, but the temperature obtained from other actuators may instead be relied upon to control the application of the actuation current. Thus, the control system can be configured to correlate the temperature at a first actuator with the temperature at a second actuator. At 748, the prescribed transmission adjustment can be carried out by vary the current applied to the actuators identified at 744 based on the temperature indication obtained from the other thermally related actuators identified at 746.

In this way, the approaches of FIGS. 7A and/or 7B can be used independently or in conjunction to coordinate actuation events among various actuators of the transmission in order to reduce variations in transmission operating state adjustments that may occur as a result of temperature fluctuations.

FIG. 8 shows a graph depicting how the shift points of the transmission can vary with temperature obtained from an actuator coil. An example shift point at which the gear ratio of the transmission can be increased or decreased is shown at 810 for a first temperature indication obtained from a transmission actuator. A second example shift point at which the gear ratio of the transmission can be increased or decreased is shown at 820 for a second temperature indication obtained from the transmission actuator. In this particular example, shift points 810 and 820 represent the same adjustment to the transmission operating state. For example, both of shift points 810 and 820 represent an adjustment of the transmission from a first gear ratio to a second gear ratio and can represent an upshift or a downshift of the transmission.

As indicated by comparing shift points 810 and 820, the operating conditions at which the transmission is shifted by the control system via at least one actuator can vary based upon the indication of temperature obtained from at least one actuator of the transmission. For example, an operating condition of vehicle speed at which the transmission is shifted can be different between the two temperature conditions as indicated by offset 830. The vehicle speed shown along the vertical axis can be obtained by the control system via a speed sensor that provides an indication of drive wheel speed. Similarly, the operating condition of engine torque at which the transmission is shift can be different between the two temperature conditions as indicated by offset 840. The engine torque shown along the horizontal axis can be obtained by the control system via a throttle positions sensor, an estimation of engine load, and can be further based on engine speed as may be obtained from crankshaft speed sensor, etc.

Thus, FIG. 8 shows an example where shift points of the transmission can be adjusted by the control system based on an indication of temperature obtained from temperature dependant electrical property of at least one actuator coil. Note that the various shift points can be stored in memory at the control system as a look-up table or map for reference.

The example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A propulsion system for a vehicle, comprising:
   a propulsion device configured to provide mechanical work via a crankshaft;
   a transmission having an input shaft coupled with the crankshaft and an output shaft, wherein said transmission includes a plurality of selectable gear ratios between the input and output shaft;
   at least one drive wheel coupled with the output shaft;
   an actuation device configured to adjust the selected gear ratio of the transmission; and
   a control system configured to adjust an electrical signal provided to the actuation device to obtain an indication of a temperature dependent electrical parameter of the actuation device and to adjust the selected gear ratio of transmission by varying the signal provided to the actuation device in response to said indication.

2. The system of claim 1, wherein said actuation device includes an actuator coil and wherein said indication of the temperature dependant electrical parameter includes a resistance of the actuator coil.

3. The system of claim 1, wherein said control system is further configured to:
   responsive to a first indication of the temperature dependent electrical parameter of the actuation device, adjust the selected gear ratio of the transmission from a first gear ratio to a second gear ratio at a first operating condition; and
   responsive to a second indication of the temperature dependent electrical parameter of the actuation device different than the first indication, adjust the selected gear ratio of the transmission from the first gear ratio to the second gear ratio at a second operating condition different than the first operating condition.

4. The system of claim 3, wherein the first operating condition includes a first speed of the drive wheel and the second operating condition includes a second speed of the drive wheel different than the first speed.

5. The system of claim 4, wherein the first operating condition further includes a first level of torque provided by the propulsion device via the crankshaft and the second operating condition further includes a second level of torque provided by the propulsion device via the crankshaft different than the first level of torque.

6. The system of claim 1, wherein the propulsion device includes an internal combustion engine.

7. The system of claim 1, wherein the propulsion device includes an electrically powered drive motor.

8. A method of operating a transmission of a vehicle powertrain including at least a first and a second actuator, comprising:
   performing a transmission shift by actuating a first transmission element via the first actuator and actuating a second transmission element via the second actuator; and
   varying a timing of actuation of the first transmission element relative to the second transmission element based on an indication of a temperature dependant electrical property of at least one of the first actuator and the second actuator.

9. The method of claim 8, further comprising:
   obtaining a first temperature indication based on a temperature dependant electrical property of the first actuator;
   obtaining a second temperature indication based on a temperature dependant electrical property of the second actuator; and
   varying said timing of actuation of the first transmission element relative to the second transmission element based on at least one of the first temperature indication and the second temperature indication.

10. The method of claim 9 further comprising, varying the timing of actuation of the first transmission element relative to the second transmission element based on a comparison of the first and second temperature indications.

11. The method of claim 9, wherein the temperature dependant electrical property of the first actuator includes a resistance of a first actuator coil of the first actuator and the temperature dependant electrical property of the second actuator includes a resistance of a second actuator coil of the second actuator.

12. A method of operating a transmission of a vehicle powertrain, said transmission including at least a first transmission actuator configured to adjust an operating state of the transmission, the method comprising:
   obtaining a first indication of temperature at the first actuator based on an electrical property of the first actuator;
   issuing a first command signal to the first actuator to adjust the operating state of the transmission; and
   varying a parameter of the first command signal responsive to the first indication of temperature at the first actuator.

13. The method of claim 12, wherein said varying the parameter of the first command signal includes adjusting a timing at which the first command signal is issued to the first actuator.

14. The method of claim 12, wherein said varying the parameter of the first command signal includes varying a magnitude of the first command signal.

15. The method of claim 12, wherein said varying the parameter of the first command signal includes varying a rate of increase or decrease of the first command signal.

16. The method of claim 12, wherein the first command signal indicates a level of current to be applied to a first actuator coil of the first actuator.

17. The method of claim 12, wherein the operating state of the transmission includes a gear ratio between an input shaft and an output shaft of the transmission and wherein the electrical property includes an electrical resistance of an actuator coil of the first actuator.

18. The method of claim 12, wherein the transmission includes at least a second transmission actuator configured to further adjust the operating state of the transmission and wherein the method further comprises:
   obtaining a second indication of temperature at the second actuator based on an electrical property of the second actuator;
   issuing a second command signal to the second actuator to further adjust the operating state of the transmission; and varying a parameter of the second command signal responsive to the second indication of temperature at the second actuator.

19. The method of claim 18, further comprising, varying the parameter of the second command signal relative to the parameter of the first command signal based on a temperature difference between the first indication of temperature and the second indication of temperature; and wherein the first parameter includes a time at which the first actuator is actuated and the second parameter includes a time at which the second actuator is actuated.

20. The method of claim 12, wherein the transmission includes at least a second transmission actuator configured to further adjust the operating state of the transmission and wherein the method further comprises:
obtaining a second indication of temperature at the second actuator based on an electrical property of the second actuator; and
further varying a parameter of the first command signal responsive to the second indication of temperature at the second actuator.

* * * * *